US010296925B2

(12) United States Patent
Dossick et al.

(10) Patent No.: US 10,296,925 B2
(45) Date of Patent: May 21, 2019

(54) AUTOMATIC PROFILING OF A MOBILE DEVICE AND/OR ITS USER

(71) Applicant: PushSpring, Inc., Seattle, WA (US)

(72) Inventors: Stephen E. Dossick, Seattle, WA (US); Karl Stillner, Seattle, WA (US)

(73) Assignee: PushSpring, Inc., Seattle, WA (US)

( * ) Notice: Subject to any disclaimer, the term of this patent is extended or adjusted under 35 U.S.C. 154(b) by 737 days.

(21) Appl. No.: 14/614,298

(22) Filed: Feb. 4, 2015

(65) Prior Publication Data
US 2015/0220943 A1 Aug. 6, 2015

Related U.S. Application Data

(60) Provisional application No. 61/936,030, filed on Feb. 5, 2014.

(51) Int. Cl.
*G06Q 30/02* (2012.01)
*H04L 29/08* (2006.01)
*H04L 29/12* (2006.01)

(52) U.S. Cl.
CPC ...... *G06Q 30/0201* (2013.01); *H04L 61/1511* (2013.01); *H04L 61/6009* (2013.01); *H04L 67/22* (2013.01); *H04L 67/303* (2013.01); *H04L 67/306* (2013.01)

(58) Field of Classification Search
CPC .......... G06Q 30/0201; G06Q 30/02; H04L 61/1511; H04L 61/6009; H04L 67/22; H04L 67/303; H04L 67/306
See application file for complete search history.

(56) References Cited

U.S. PATENT DOCUMENTS

| | | | | |
|---|---|---|---|---|
| 7,747,749 B1* | 6/2010 | Erikson | ............. | G06F 17/30902 709/219 |
| 9,215,123 B1* | 12/2015 | Fears | ...................... | H04L 67/22 |
| 2002/0111910 A1* | 8/2002 | Walsh | ..................... | H04L 67/22 705/51 |
| 2014/0074445 A1* | 3/2014 | van Elsas | .......... | G06Q 30/0246 703/2 |

* cited by examiner

*Primary Examiner* — Nam T Tran
(74) *Attorney, Agent, or Firm* — Cloutier Arnold Ortega PLLC

(57) ABSTRACT

In embodiments, a unique ID may be generated for a user of a mobile device by requesting, from a DNS server, an address record for each domain name of a series of domain names to create an address record set. The address record for each domain name may be randomly selected from a group of address records associated with the respective domain name. The unique ID may then be generated utilizing the address record set. In other embodiments, a list of URI schemes may be sent to the mobile device, which may respond with an indication of a subset of the URI schemes that are supported by the mobile device. This subset of the URI schemes may then be correlated with one or more associated native applications to identify native applications installed on the mobile device to automatically profile the mobile device. Other embodiments may be described and/or claimed.

11 Claims, 8 Drawing Sheets

Non-transitory computer-readable storage medium
802

Programming Instruction 804
configured to cause a computing device, in response to execution of the programming instructions, to practice one or more operations of the methods described in reference to Figures 1-6.

FIG. 8

AUTOMATIC PROFILING OF A MOBILE DEVICE AND/OR ITS USER

CROSS-REFERENCE TO RELATED APPLICATION

This application claims the benefit of U.S. Provisional Application No. 61/936,030, filed Feb. 5, 2014, entitled "METHODS OF GENERATING A SINGLE ANONYMOUS USER IDENTITY ACROSS MOBILE APPLICATIONS AND OF DEVELOPING AN INSTALLED MOBILE APPLICATION PROFILE FOR A MOBILE DEVICE," the entirety of which is incorporated herein by reference.

TECHNICAL FIELD

Embodiments of the present disclosure are related to the field of mobile devices, and in particular, to automatically profiling of a mobile device and/or its user.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

It is relatively common to see a provider of goods and/or services offering both a website and a native application for consumers to utilize when trying to procure the provider's goods and/or services. Monitoring of a user's interactions on a website or native application can offer insight about the user to the provider; however, under the current state of the art, there is virtually no practical way to correlate the interactions of a user on a website with interactions of the same user through the native application without involving personal identifying information (PII). As a result, the provider is typically working with only a fraction of the information that could be utilized with respect to the user. In addition, there is other information that could be utilized by the provider, such as whether the user has visited a competitor's website or has a competitor's native application installed. Again, the current state of the art is lacking in this area, as there is virtually no practical way for the provider to determine such things. As a result, the provider's perspective on the user is limited in scope.

BRIEF DESCRIPTION OF THE DRAWINGS

FIG. 8 illustrates an example storage medium with instructions configured to enable a computing device to practice the present disclosure, in accordance with various embodiments.

DETAILED DESCRIPTION OF ILLUSTRATIVE EMBODIMENTS

Figure 1:
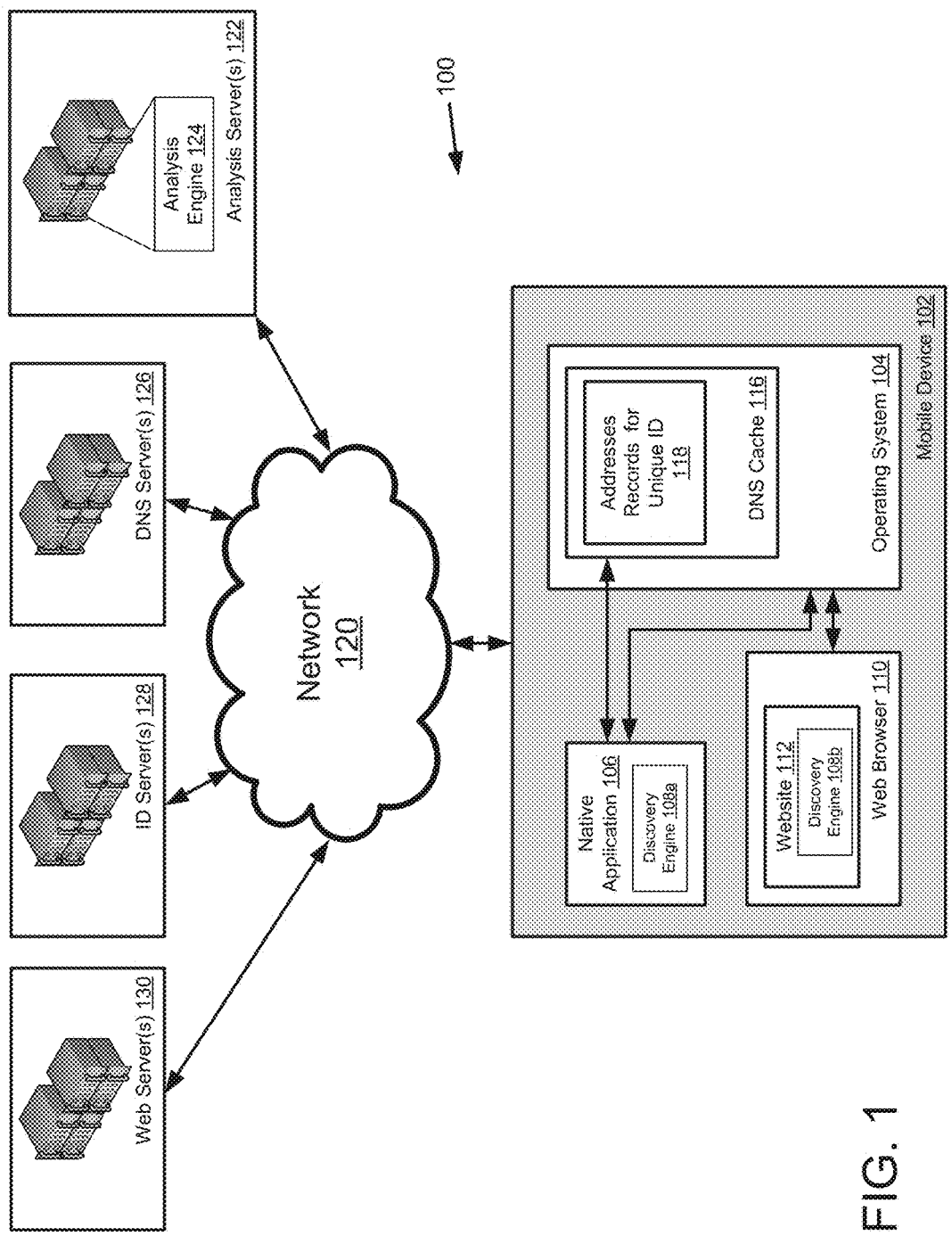
FIG. 1 depicts an illustrative computing environment for automatically profiling mobile device and/or their users, in accordance with various embodiments of the present disclosure.

Operating platforms of mobile devices, such as, for example, iOS from Apple, Inc. of Cupertino, Calif., Android from Google, Inc. of Mountain View, Calif., Windows Phone from Microsoft Corp. of Redmond, Wash., or Blackberry OS from Blackberry Ltd. of Waterloo, Ontario, Canada, to name a few, may provide native applications with an identifier of the device on which the operating platform resides. Such an identifier may be, for example, an Identifier for Advertising (IDFA) on iOS or a Device ID on Android. Native applications may be able to retrieve this identifier and send it to back-end services, such as, for example, those provided by PushSpring, Inc. of Seattle, Wash., which may allow the back-end services to identify a user across applications to automatically profile the user. As used herein, automatically may refer to autonomously, or without user interaction.

Mobile web browsers, on the other hand, do not make this identifier available to web sites visited on the mobile device. Instead, these web sites and web-oriented back-end platforms may use different technologies (e.g., cookies, HTML local data storage, "fingerprints" based on specific details of how the web site is connected to by the web browser, etc.) to attempt to identify an individual user.

On a mobile device, native applications may run within a "sandbox" that may prevent native applications installed on the same mobile device from accessing one another's sandbox. The web browser on a mobile device may be treated like any other native application and may thus be unable to reach into other native applications' sandboxes for data. Likewise, other applications cannot reach into the web browser's sandbox. Because of this sandboxing, it's not possible for a web site and a native application to work together to identify a single user. The web site is able to identify the user, via the aforementioned cookies, for example, and applications can identify the user via the device identifier mentioned above, but back-end servers can never be sure (without involving personal identifying information ("PII")) that a user of a native application is the same individual who is using a web site.

For example, a single user of a mobile device may have a native application installed on their device from a major retailer (e.g., Amazon.com, Inc.). Sometimes, they may use that native application to search for product information. Other times, they may use the web browser on their mobile device to connect to the web site maintained by the retailer to search for other product information. It is not currently possible to accurately identify the totality of searches coming from a single user, on the same mobile device, who uses both the application and mobile site. It is thus impossible to make decisions about how to communicate with the user (in the form of coupons, offers, advertisements, content customizations, etc.) that are based on all of the user's interactions with the retailer.

In addition, many operating platforms, such as those mentioned above, do not allow applications to ask for a simple list of native applications installed on the user's mobile device. These operating platforms that employ a sandbox security policy also do not permit native applications installed on the mobile device to be aware of other native applications installed on the mobile device. This policy has important security and privacy rationales; however it also prevents applications from providing optimized content to the mobile device user for that user's preferences without subjecting the user to an exhaustive manual profiling process. This policy also prevents applications from leveraging information about the user that could be gained from knowledge of the user's use of other applications and/or the web browsing of the user on the mobile device.

What is discussed herein are methods, apparatuses, and computer-readable media for automatically obtaining an accurate profile of a mobile device and/or its user which may match a user's use of a first native application with the same user's use of one or more additional native applications or websites, without violating sandbox policies that may be implemented by the operating platform of the mobile device or requiring personal identifying information (PII), and may enable identification of native applications installed on the mobile device to facilitate the incorporation of such information into the profile of the user.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 depicts an illustrative computing environment 100 for automatically profiling mobile devices and/or their users, in accordance with various embodiments of the present disclosure. In embodiments, computing environment 100 may include a mobile device 102, analysis server(s) 122, domain name service (DNS) server(s) 126, identification (ID) server(s) 128, and web server(s) 130, selected one/ones of which are incorporated with teachings of the present disclosure for automatically profiling mobile devices and/or their users. In embodiments, all of these components may be communicatively coupled through network 120 via, for example, a communication interface, such as that depicted in FIG. 7, below. Network 120 may be any wired or wireless network, or any combination thereof, such as, for example, a wireless cellular network.

Mobile device 102 may be configured with an operating system (OS) 104, such as, for example, one of the operating platforms discussed above, one or more native applications (e.g., native application 106), and web browser 110. OS 104 may be configured with domain name service (DNS) cache 116 which may be configured to store address records that correlate domain names with a corresponding address record containing an internet protocol (IP) address. Domain names may also be referred to alternatively herein as endpoints. These address records that are stored in DNS cache 116 may be the result of domain name requests submitted by the one or more native applications or the web browser to DNS Server(s) 126.

In embodiments, web browser 110 may be utilized by a user to navigate to website 112. Website 112 may be, for example, an e-commerce website hosted by web server(s) 130 and owned by an e-commerce company (e.g., Acme, Inc.). Website 112 may be utilized by such a company for marketing or sale of the company's goods and/or services to users of website 112. In embodiments, native application 106 may be an application distributed by the same e-commerce company for marketing or sale of the company's goods and/or services to users of native application 106.

In embodiments, the user of mobile device 102 may utilize both native application 106 and web browser 110 to interact with the e-commerce company. As mentioned above, when the user utilizes both native application 106 and web browser 110 to interact with the e-commerce company, it may be desirable to make decisions about how to communicate with the user (in the form of coupons, offers, advertisements, content customizations, etc.) that are based on all of the user's interactions with the e-commerce company, including their interactions with the company via both the native application 106 and website 112 being executed within web browser 110. However, also as mentioned above, all applications may be running within individual protected sandboxes, which may prevent one application from accessing other applications' sandboxes which may make such decisions impossible.

In embodiments, OS 104 may be configured to share DNS records that are requested by various applications installed on the device (including native application 106, and web browser 110) via DNS cache 116. For example, when a user uses native application 106 or web browser 110, to interact with the e-commerce company via the Internet, the native application 106 or the web browser 110 may be configured to provide a domain name associated with the e-commerce company to OS 104. OS 104 may then be configured check DNS cache 116 to determine if an address record associated with that domain name has already been stored in DNS cache 116, and, therefore, whether OS 104 already knows the IP address that corresponds with the requested domain name to utilize in connecting with the requested domain name. If an address record has not been stored in DNS cache 116, OS 104 may be configured to send a request for an address record associated with the requested domain name to DNS server(s) 126. DNS server(s) 126 may be configured to, in response to the request, return the address record to OS 104. OS 104 may then be configured to store the address record in DNS cache 116 as well as return at least the IP address contained within the address record to the requesting application. For example, if a domain name is first requested by native application 106, then OS 104 may request the address record from DNS server(s) 126 and the address record may be stored in DNS cache 116, as discussed above. If a subsequent request for the same domain name is received from web browser 110, then the address record stored in DNS cache 116 from the previous request may be utilized.

Because DNS cache 116 may be shared between the native applications and web browser 110, DNS cache may, in some embodiments, be utilized to store a unique identifier to associate with the user of mobile device 102 in the form of a series of address records. Such a series of address records is represented by address records for unique ID 118, hereinafter referred to as address records 118 for simplicity. In such embodiments, the e-commerce company, or a back-end services provider, such as PushSpring, Inc., may maintain a DNS server in DNS Server(s) 126 that is configured to return random, but valid, address records, also known as type A records, associated with a series of domain names of online resources. As used herein, a valid address record may include an address record that resolves to an operational server. As an example, the series of domain names may be a.acme.com through z.acme.com. Each domain name of this series of domain names may be associated with a plurality of address records. When OS 104 queries the DNS server for the address record of each domain name of the series of domain names, the DNS server may select and return a random, but valid, address record from the plurality of address records associated with each of the domain names. As a result, the series of address records returned for the series of domain names may be unique to the user of mobile device 102 and therefore may be utilized as a unique identifier, or a unique identifier may be calculated therefrom. The DNS server's response may also instruct OS 104 to cache the address records (e.g., address records 118) for a long period of time (e.g. 30 days or more). Such a period of time may commonly be referred to as a time to live (TTL).

Native application 106 and website 112 may both be instrumented with discovery engine 108a and discovery engine 108b, respectively. These discovery engines may be, for example, PushSpring SDKs available from PushSpring Inc. Discovery engines 108a and 108b may be configured to request the above discussed series of domain names. For example, when native application 106 is first instantiated, discovery engine 108a may cause native application 106 to request domain names a.acme.com through z.acme.com. If it is the first time OS 104 is requesting the DNS records associated with this series of domain names, OS 104 may submit a DNS request for the address record of each of these domain names to DNS server(s) 126. As mentioned above, DNS server(s) 126 may respond with a random, but valid, address record for each DNS request. These random, but valid, address records may be cached in DNS cache 116. The next time the domain names are requested, regardless of whether web browser 110 or native application 106 is making the request, OS 104 will rely on address records 118 in DNS cache 116 to fulfill the request, delivering the same result. Thus, a unique identifier is created that can be determined by both the mobile application and the web server by combining the random results obtained from these DNS requests.

External websites (e.g., website 112) being executed by web browser 110 may not directly access the contents of DNS cache 116, but they may be able to ask web browser 110 to open a hypertext terminal protocol (HTTP) connection to a server identified by an address record stored in DNS cache 116. Thus each of address records 118 may also need to be an address record to a valid server (e.g., ID server(s) 128). An HTTP request submitted to such a valid server may return a response readable by website 112 containing that server's portion of the identifier for that user. For instance, if an address record lookup of a.acme.com has returned a value of 51.45.127.31, an HTTP request to that server should return the same value, 51.45.127.31, to website 112, allowing website 112 to determine the unique ID. The process of generating this unique identifier is discussed in further detail with respect to FIGS. 3-5, below.

The unique ID discussed above may be transmitted by native application 106 or website 112 to analysis engine 124 of analysis server(s) 122 in order to enable correlation of information about the user of mobile device 102. For example, in some embodiments, discovery engine 108a may be configured to monitor the user's interactions with native application 106 to produce native application activity information associated with these interactions. This native application activity information may be transmitted to analysis engine 124 of analysis server(s) 122 along with the unique ID. Likewise, discovery engine 108b may be configured to monitor the user's interactions with website 112 to produce website activity information associated with these interactions. This website activity information may be transmitted to analysis engine 124 of analysis server(s) 122 along with the unique ID. The analysis engine may be configured to correlate the native application activity information and the website activity information utilizing the unique ID. In other embodiments, web server(s) 130 may be configured to perform such monitoring. In such embodiments, the unique ID may be passed to web server(s) 130 which may then pass along any associated activity information and the unique ID to analysis engine 124.

In addition to the user's interaction with native application 106 and website 112, identifying the native applications installed on mobile device 102 may provide additional information about the user of mobile device 102. As mentioned above, though, many operating platforms do not allow applications to ask for a simple list of native applications installed on the user's mobile device. However, native applications may be able to register the ability to handle certain uniform resource identifier (URI) schemes when they are installed on the user's mobile device. These URI schemes may be unique to the native application that registers the ability to handle the URI schemes. For instance, a web browser application might register its ability to handle URIs of the scheme "http" or "https". Another application, for example, one from Acme, Inc., might register the ability to handle URIs of the scheme "acme." It will be appreciated that actual URI schemes may be much more cryptic in nature and that the above example is merely meant for illustration. Applications cannot merely query OS 104 for a simple list of what URIs can be handled on mobile device 102. An application (e.g., native application 106) may, however, submit a request to OS 104 to determine if a specific URI scheme is supported. This may require, due in part to the cryptic nature of the URI schemes, an intimate understanding of the URI schemes associated with various applications.

Because of the above, it is possible to determine a list of native applications installed on mobile device 102 by iterating through a series of known URI schemes to determine those URI schemes supported by one or more native applications of mobile device 102. The URI schemes supported by one or more native applications may then be correlated with an application associated with the URI in order to identify native applications installed on mobile device 102 to automatically profile mobile device 102. It will be appreciated that the above described process may be resource intensive. As a result, either of discovery engines 108a and 108b may, in some embodiments, be configured to download a portion of the potential URI schemes and determine which URI Schemes of the portion of potential URI schemes are able to be handled by the mobile device. This allows the identification of native applications installed on a given user's mobile device to be done in stages in order to build up a more detailed profile of that user. By mapping that list of applications onto other metadata (for instance, the cost of an application on the app store, the category the various applications are listed under) other information for the user can be further inferred, such as, for example, demographic information of the user.

As such, in some embodiments, discovery engine 108a and 108b may be configured to request a list of URI schemes from analysis engine 124. Analysis engine 124 may be configured to transmit a list of a plurality of URI schemes to the requesting discovery engine. The requesting discovery engine may then iterate through the list of URI schemes to determine if any native applications installed on mobile device 102 support the individual URI schemes. The requesting discovery engine may then be configured to transmit, and analysis engine 124 may be configured to receive, the above discussed unique ID and an indication of a subset of the list of URI schemes that are supported by the mobile device. The analysis engine may then be configured to correlate individual URI schemes of the subset of URI schemes with one or more associated native applications to identify native applications installed on the mobile device to automatically profile the mobile device and to associate those identified native applications with the unique ID to subsequently automatically profile a user of the mobile device. This process is discussed in greater detail with respect to FIG. 6, below. It will be appreciated that the above discussed correlation of native application activity information and website activity information utilizing the unique ID, and the identifying native applications utilizing URI schemes may be performed in conjunction or independently of one another.

Figure 2:
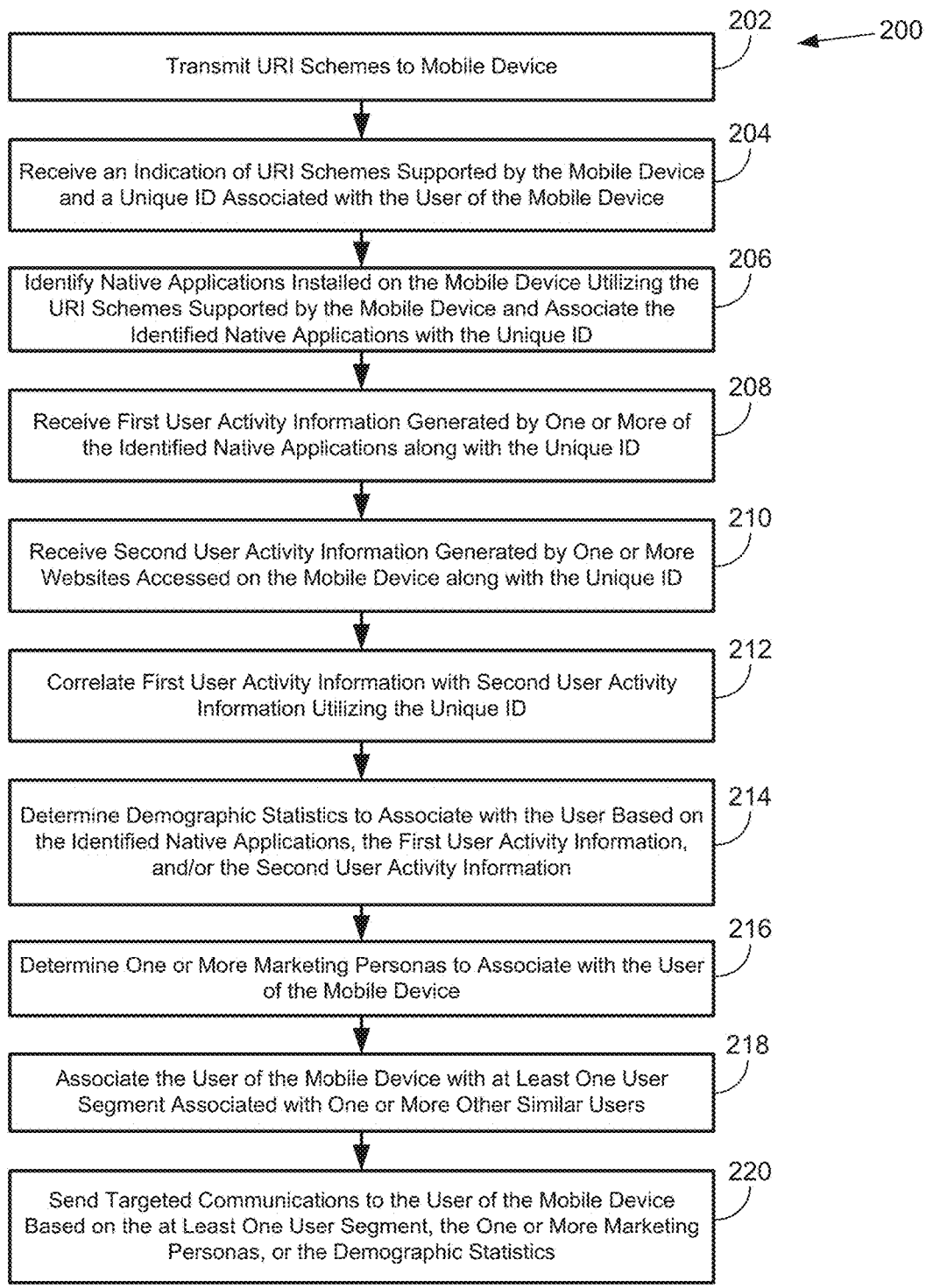
FIG. 2 is a flow chart depicting an illustrative process flow of an analysis engine for automatically profiling mobile devices and/or their users, in accordance with various embodiments of the present disclosure.

FIG. 2 is a flow chart depicting an illustrative process flow 200 of an analysis engine of an analysis server, such as analysis engine 124 of FIG. 1, in accordance with various embodiments of the present disclosure. Such an analysis engine and the associated analysis servers may be maintained, for example, by a back-end services provider such as that mentioned elsewhere herein. Process flow 200 may begin at block 202 where analysis engine may transmit a list of URI schemes to a mobile device, such as mobile device 102 of FIG. 1, for example. In some embodiments, the list of URI schemes may be transmitted in response to a request from the mobile device, for example, from a discovery engine integrated with a native application or a website executing within a browser of the mobile device. The mobile device may iterate through the URI schemes to determine a subset of the URI schemes that are supported by at least one native application installed on the mobile device. At block 204, the analysis engine may receive an indication of the URI schemes determined to be supported by the mobile device. In addition, the analysis engine may receive a unique ID, such as that discussed elsewhere herein, associated with the user of the mobile device. At block 206, the analysis engine may utilize the subset of the URI schemes that are supported by at least one native application installed on the mobile device to identify native applications installed on the mobile device to automatically profile the mobile device. Such an identification may be carried out by correlating the subset of URI schemes with associated applications via, for example, a database of such URI schemes. In addition, analysis engine may associate the identified native applications with the unique ID and thereby associate the identified native applications with the user of the mobile device. This process is discussed further in reference to FIG. 6, below.

At block 208, the analysis engine may receive first user activity information generated by one or more of the identified native applications along with the Unique ID. In addition, at block 210, analysis engine may receive second user activity information generated by one or more websites accessed on the mobile device along with the unique ID. The analysis engine may then correlate the first user activity information with the second user activity information utilizing the unique ID. In addition, analysis engine may save the correlated activity information into a user profile database of the analysis engine, or accessible to the analysis engine, to correlate the activity information with previously activity information associated with the same unique ID.

At block 214, the analysis engine may determine demographic statistics to associate with the user based on the identified native applications, the first user activity information, and/or the second user activity information. For example, based on the identified native applications the analysis engine may be able to determine what gender the user is likely to be. From the first or second user activity information, the analysis engine may be able to determine a likely household income, etc.

At block 216, the analysis engine may determine one or more marketing personas to associate with the user of the mobile device. This may be accomplished by, for example, applying an ontology of characteristics for users (age, gender, app usage frequency, other apps installed, etc.), along with a set of reference personas that the ontology of characteristics may be mapped onto. Users of a mobile application may be classified into marketing personas, i.e. "sports guy," "auto enthusiast," etc., which can then be used for targeted marketing messaging via advertising, coupons, offers, push notifications, sms, etc.

At block 218, the analysis engine may associate the user of the mobile device with at least one user segment associated with one or more other similar users. Such an association may be based on the information collected or inferred with respect to the user's demographic information, their persona classifications, their activity within a native application or website, the native applications installed on the mobile device, and/or any other data available about the user, to determine the user's similarity with other users or segments of users. Such a determination may be based, for example, on commonality of application usage, demographics, or some combination of both. The application owner or website provider may then further target such segments, or individual users of such segments, with customized communications (advertisement, coupon, offer, push notification, sms, email, etc). For example, as new users interact with an application, they may be identified as belonging to a particular segment, such as by satisfying elements of a segment definition, and a predefined communication may be automatically transmitted to that user.

Figure 3:
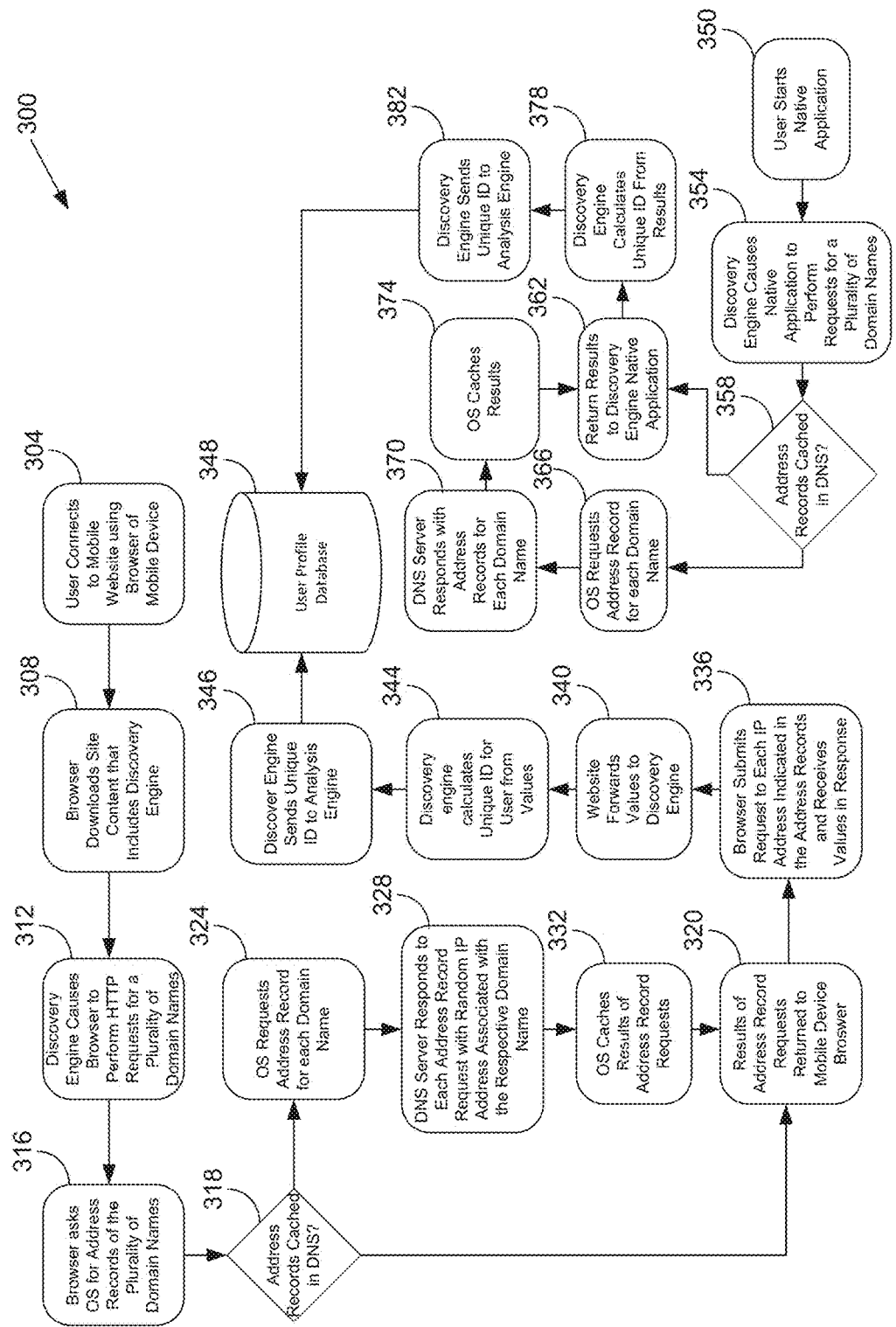
FIG. 3 is a flow chart depicting an illustrative process flow for determining a unique ID of a mobile device, in accordance with various embodiments of the present disclosure.

FIG. 3 is a flow chart depicting an illustrative process flow 300 for determining a unique ID of a mobile device, such as that discussed elsewhere herein, in accordance with various embodiments of the present disclosure. Beginning at block 304 a user may connect to a mobile website via a web browser of the user's mobile device (e.g., mobile device 102 of FIG. 1). The web browser may then download, at block 208, the content of the mobile website, which may include a discovery engine (e.g., discovery engine 108b of FIG. 1). At block 312, the discovery engine may cause the web browser to initiate a series of HTTP data requests to a series of domain names. In turn, at block 316 the web browser may ask the OS of the mobile device for address records associated with the series of domain names. At block 318 the OS of the mobile device may attempt to locate a DNS record for each requested domain name in its DNS cache (e.g., DNS cache 116).

If the OS successfully locates the requested DNS records in its DNS cache, the process may proceed to block 320 where the OS may return the requested DNS records to the web browser. If, however, the OS does not locate the requested DNS records in its DNS cache, the OS may, at block 324, make a network request for DNS type A records, referred to herein as address records, for the requested domain names. This request may be routed, for example, in accordance with internet protocol (IP) to a DNS server (e.g., DNS server(s) 126 of FIG. 1), which may respond to the request at block 328 with a valid, but randomly assigned address record for each of the requested domain names. The OS will receive the resulting address records and store them in its DNS cache at block 332. At block 320, the OS may return the results of the address record requests to the web browser of the mobile device.

The web browser may then initiate an HTTP connection at block 336 to each of the IP addresses included in the results of the address record requests. These IP addresses may correspond with ID Servers (e.g., ID Server(s) 128 of FIG. 1) that may respond to the HTTP request with a value equal to the IP address utilized to initiate the HTTP connection. In doing this, the website may be provided with the IP addresses of the results of the address record requests even though the web browser may not make these IP addresses available to the website. At block 344, the discovery engine may then calculate a unique ID for the user of the mobile device based on the values returned from the ID servers. Calculating the unique ID may, in some embodiments, be as simple as concatenating the values together, while, in other embodiments, the values may be manipulated in some way to arrive at the unique ID. At block 346, the unique ID may be transmitted to an analysis engine (e.g., analysis engine 124 of FIG. 1) to be utilized by the analysis engine to uniquely identify the user of the mobile device without using any personal identifying information (PII) or a device ID, such as those discussed previously. In some embodiments, the analysis engine may be responsible for generating the unique ID from the values discussed above. In such embodiments, the discovery engine may merely transmit the values returned from the ID servers to the analysis engine to enable the analysis engine to generate the unique ID. Regardless of where the unique ID is calculated, the unique ID and records of any current activities may then be transmitted at block 348 to a user profile database of the analysis engine for storage and association with any existing records for the user.

A second entry point for process flow 300 begins at block 350 where the user may initiate a native application on the user's mobile device. The native application may be configured with a discovery engine (e.g., discovery engine 108a of FIG. 1). At block 354, the discovery engine may cause the native application to ask the OS of the mobile device for address records associated with a series of domain names. In embodiments, these may be the same domain names as discussed in reference to the web browser above. At block 358 the OS of the mobile device may attempt to locate a DNS record for each requested domain name in its DNS cache (e.g., DNS cache 116).

If the OS successfully locates the requested DNS records in its DNS cache, the process may proceed to block 362 where the OS may return the requested DNS records to the native application. If, however, the OS does not locate the requested DNS records in its DNS cache, the OS may, at block 366, make a network request for address records for the requested domain names. This request may be routed, for example, in accordance with internet protocol (IP) to a DNS server (e.g., DNS server(s) 126 of FIG. 1), which may respond to the request at block 370 with a valid, but randomly assigned address record for each of the requested domain names. The OS will receive the resulting address records and store them in its DNS cache at block 374. At block 362, the OS may return the results of the address record requests to the native application. The discovery engine of the native application may then determine at block 378 a unique ID for the user by combining the IP addresses of the resulting address records. At block 382, the discovery engine may transmit the user identifier to an analysis engine to be associated with the user's present activities and may store this information in a user profile database at 348 for association with any existing records for the user.

While discussed above in reference to a single company's website and native application, it will be appreciated that this was merely meant to be illustrative. Other embodiments may include any combination of companies, websites, and or native applications across which the user's activities may be tracked utilizing the unique ID above. For example, additional embodiments may include a single company with multiple native applications; two companies each with a native application and or website; multiple companies each with at least one native application and/or website, etc.

Figure 4:
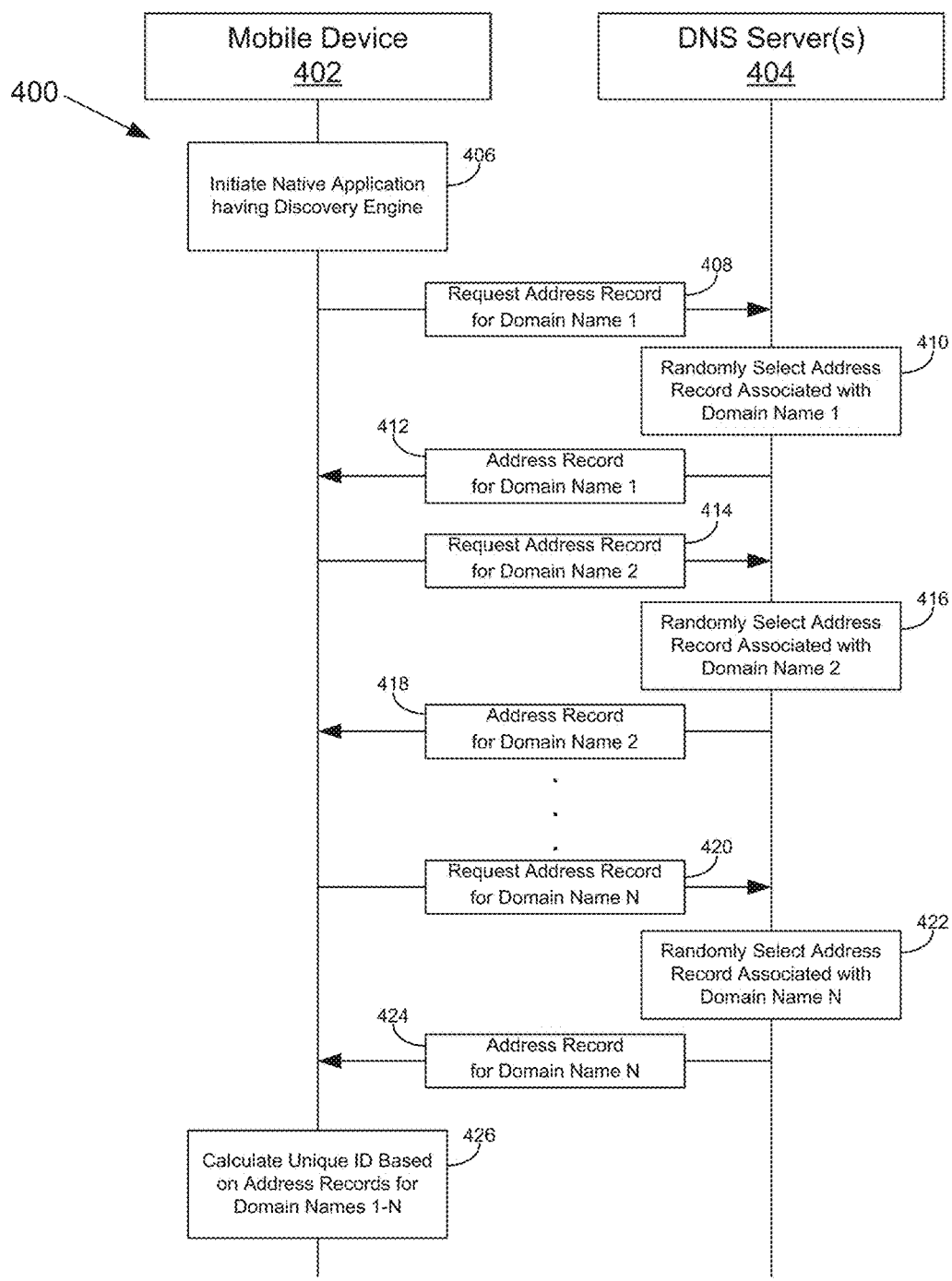
FIG. 4 is an interaction diagram depicting an illustrative interaction flow for determining a unique ID of a mobile device by a native application of the mobile device, in accordance with various embodiments of the present disclosure.

FIG. 4 is an interaction diagram depicting an illustrative interaction flow 400 between a mobile device 402 and DNS server(s) 404 for determining a unique ID of a mobile device by a native application of the mobile device, in accordance with various embodiments of the present disclosure. Interaction flow 400 may begin at block 406 where a native application installed on mobile device 402 may be initiated. In embodiments, as depicted, the native application may have a discovery engine, such as that discussed elsewhere herein, integrated therewith.

Once the native application has initiated, the discovery engine integrated therewith may cause an OS of mobile device 402 to submit an address request at block 408 for a first domain name, domain name 1, of a series of domain names. DNS server(s) 404 may, at block 410, in response to receiving the request, randomly select an address record from a plurality of address records associated with domain name 1. DNS server(s) 404 may then transmit the selected address record back to mobile device 402 at block 412 where the address record may be cached (e.g., in DNS cache 116 of FIG. 1) for future use. Discovery engine may then cause the OS of mobile device 402 to submit another address request at block 414 for a second domain name, domain name 2, of the series of domain names. DNS server(s) 404 may, at block 416, in response to receiving the request, randomly select an address record from a plurality of address records associated with domain name 2. DNS server(s) 404 may then transmit the selected address record back to mobile device 402 at block 418 where, again, the address record may be cached for future user.

The discovery engine may continue to iterate through the domain names of the series of domain names until domain name N is reached, where N corresponds with the number of domain names in the series of domain names. Once domain name N is reached by the discovery engine, the discovery engine may cause the OS of mobile device 402 to submit a final address request at block 420 for the domain name N, the last domain name of the series of domain names. DNS server(s) 404 may, at block 422, in response to receiving the request, randomly select an address record from a plurality of address records associated with domain name N. DNS server(s) 404 may then transmit the selected address record back to mobile device 402 at block 424, where, as above, the address record may be cached.

At block 426, the discovery engine may calculate a unique ID based on all of the address records returned for domain names 1-N. This may, in some embodiments, be accomplished by concatenating, or otherwise combining, the address records for domain names 1-N. In other embodiments, the address record for the domain names 1-N may be manipulated in some way to determine the unique ID. This unique ID may be utilized to correlate various information of the user of mobile device 402, as discussed elsewhere herein.

In embodiments, the number of domain names, N, in the series of domain names may be selected such that the loss of one or more of the address records associated with the series of domain names may still resolve to a unique ID due to the size of the namespace of the unique ID. For example, if the unique ID is based on address records for a.acme.com through z.acme.com, the unique ID comprises 26 address records. As such, each address record in such a unique ID only contributes 3.8% of the unique ID information. The loss of two of the address records in such a series of address records would only result in the unique ID being approximately 7% different and, as a result, may still serve to provide a unique ID. This is the case regardless of whether the unique ID is established through a native application or, as discussed below, a website.

Figure 5:
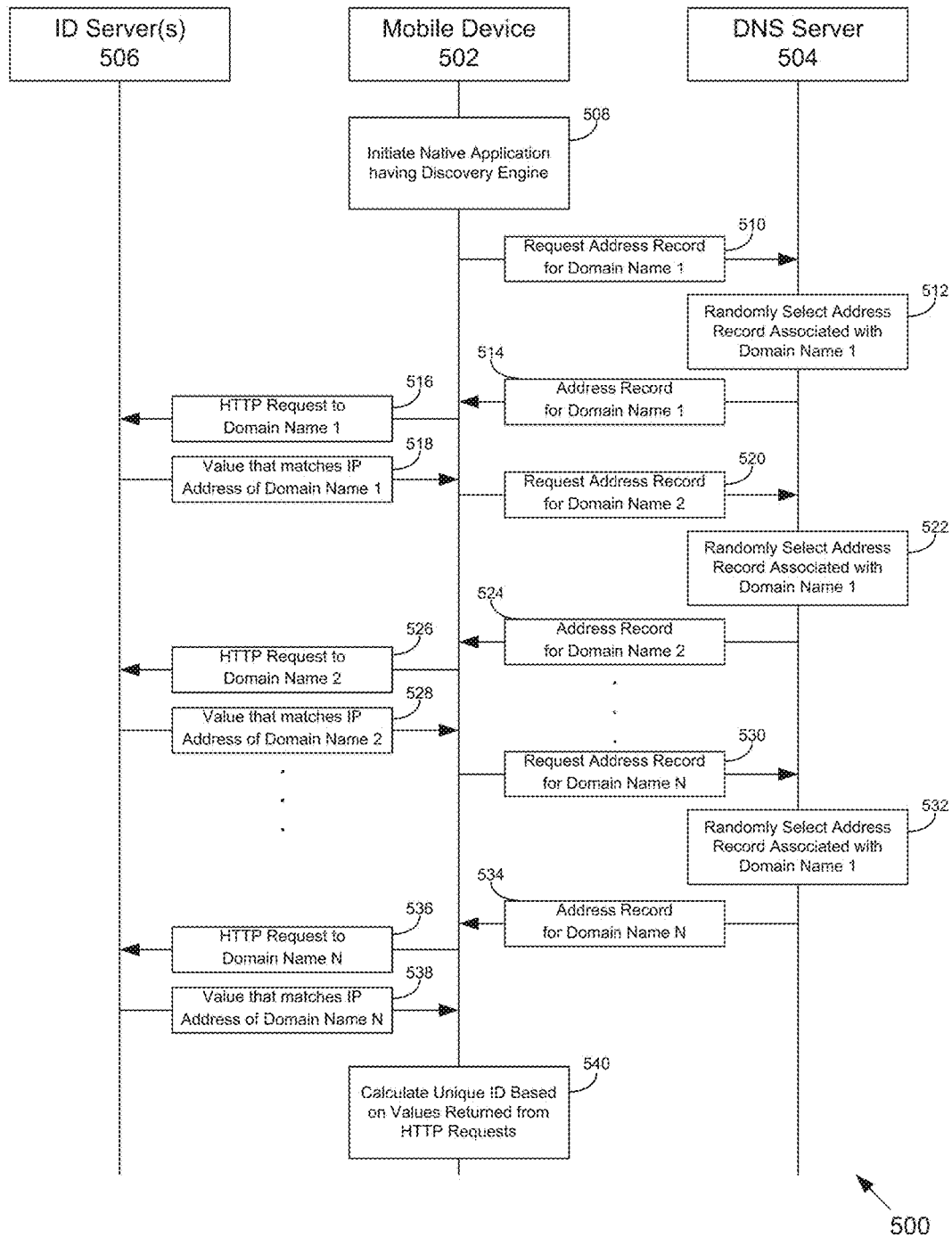
FIG. 5 is an interaction diagram depicting an illustrative interaction flow between a mobile device, DNS server(s) and ID Server(s) for determining a unique ID of a mobile device by a website, in accordance with various embodiments of the present disclosure.

FIG. 5 is an interaction diagram depicting an illustrative interaction flow 500 between a mobile device 502, DNS server(s) 504 and ID Server(s) 506 for determining a unique ID by a website, in accordance with various embodiments of the present disclosure. Interaction flow 500 may begin at block 508 where a website executing within a browser on mobile device 502 may be initiated. In embodiments, as depicted, the website may have a discovery engine, such as that discussed elsewhere herein, integrated therewith.

Once the website has initiated, the discovery engine integrated therewith may cause the browser to submit a request to an OS of mobile device 502 for an address record based on a specified domain name, e.g. domain name 1, which may represent a first domain name of a series of domain names. Such a request from the browser may cause the OS to submit an address request at block 510 for domain name 1 to DNS server(s) 504. DNS server(s) 504 may, at block 512, in response to receiving the request, randomly select an address record from a plurality of address records associated with domain name 1. DNS server(s) 504 may then transmit the selected address record back to mobile device 502 at block 514 where the address record may be cached (e.g., in DNS cache 116 of FIG. 1), for future use, and returned to the browser. As discussed previously, the browser may not make the address record returned for domain name 1 available to the website. As a result, it may be necessary for the website to cause the browser to initiate an HTTP connection with domain name 1 at block 516 utilizing the address record for domain name 1. As depicted, domain name 1 may correspond with one of ID server(s) 506. In response, at block 518, ID server(s) 506 may send a value that matches the IP address of domain name 1 to the browser for forwarding to the website. For example, if the address record for domain name 1 reflects an IP address of 51.45.127.31, establishing an HTTP connection with domain name 1 may return a value of 51.45.127.31. This may ensure that the website and a native application are both working with the same numbers when generating the unique ID.

The discovery engine may then cause the browser to submit a request to the OS for an address record for domain name 2. Such a request from the browser may cause the OS to submit an address request at block 520 for domain name 2 to DNS server(s) 504. DNS server(s) 504 may, at block 522, in response to receiving the request, randomly select an address record from a plurality of address records associated with domain name 2. DNS server(s) 504 may then transmit the selected address record back to mobile device 502 at block 524 where the address record may be cached and returned to the browser. The website may then cause the browser to initiate an HTTP connection with domain name 2 at block 526 utilizing the address record for domain name 2. As with domain name 1, domain name 2 may correspond with one of ID server(s) 506. In response, ID server(s) 506 may send, at block 528, a value that matches the IP address of domain name 2 to the browser for forwarding to the website.

The discovery engine may continue to iterate through the domain names of the series of domain names until domain name N is reached, where N corresponds with the number of domain names in the series of domain names. Once domain name N is reached by the discovery engine, the discovery engine may cause the browser to submit a request to the OS for an address record for domain name N. Such a request from the browser may cause the OS to submit an address request at block 530 for domain name N to DNS server(s) 504. DNS server(s) 504 may, at block 532, in response to receiving the request, randomly select an address record from a plurality of address records associated with domain name N. DNS server(s) 504 may then transmit the selected address record back to mobile device 502 at block 534 where the address record may be cached and returned to the browser. The website may then cause the browser to initiate an HTTP connection with domain name N at block 536 utilizing the address record for domain name N. As with domain names 1 and 2, domain name N may correspond with one of ID server(s) 506. In response, ID server(s) 506 may send, at block 528, a value that matches the IP address of domain name N to the browser for forwarding to the website.

At block 540, the discovery engine may calculate a unique ID based on values returned by ID server(s) 506. This may, in some embodiments, be accomplished by concatenating, or otherwise combining, the values. In other embodiments, the values may be manipulated in some way to determine the unique ID. This unique ID may be utilized to correlate various information of the user of mobile device 502, as discussed elsewhere herein.

Figure 6:
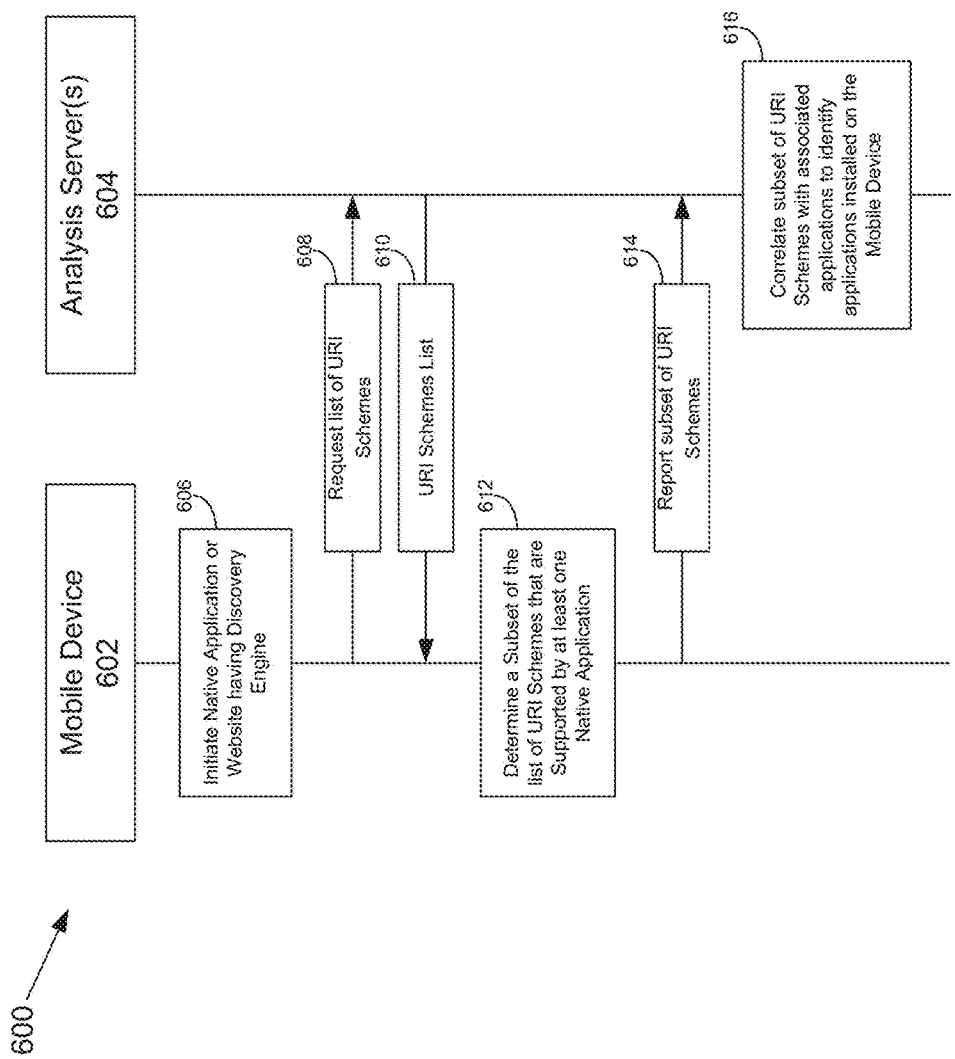
FIG. 6 is an interaction diagram depicting an illustrative interaction flow between a mobile device and analysis server(s) for identifying native applications installed on a mobile device to automatically profile the mobile device, in accordance with various embodiments of the present disclosure.

FIG. 6 is an interaction diagram depicting an illustrative interaction flow 600 between a mobile device 602 and analysis server(s) 604 for identifying native applications installed on a mobile device to automatically profile the mobile device, in accordance with various embodiments of the present disclosure. Interaction flow 600 may begin at block 606 where a website executing within a browser on mobile device 602 or a native application installed on mobile device 602 may be initiated. In embodiments, as depicted, the website or the native application may have a discovery engine, such as that discussed elsewhere herein, integrated therewith. At block 608, the discovery engine may request a list of URI schemes from analysis server(s) 604. In response, analysis server(s) 604 may respond at block 610 with a list of URI schemes. At block 612, the discovery engine may iterate through the list of URI schemes to determine a subset of the list of URI schemes that are supported by one or more native applications installed on mobile device 602. At block 614, the subset of the list of URI schemes, along with a unique ID, such as that discussed elsewhere herein, identifying the user of mobile device 602, may be reported back to analysis server(s) 604. Finally, at block 616, the subset of the list of URI schemes may be correlated with associated native applications to identify native applications installed on mobile device 602 to automatically profile the mobile device, and the identified native applications may be correlated with the unique ID to be utilized for developing a profile for the user.

As mentioned above, in some embodiments, the list of URI schemes may be a portion of the total potential URI schemes. In such embodiments, the request submitted at block 608 may also include a unique ID, such as that discussed elsewhere herein, to uniquely identify the user of mobile device 602. The unique ID may then be utilized by analysis server(s) 604 to determine a portion of the potential URI schemes that have yet to be processed by mobile device 602 and the URI schemes list may be based on such a determination.

Figure 7:
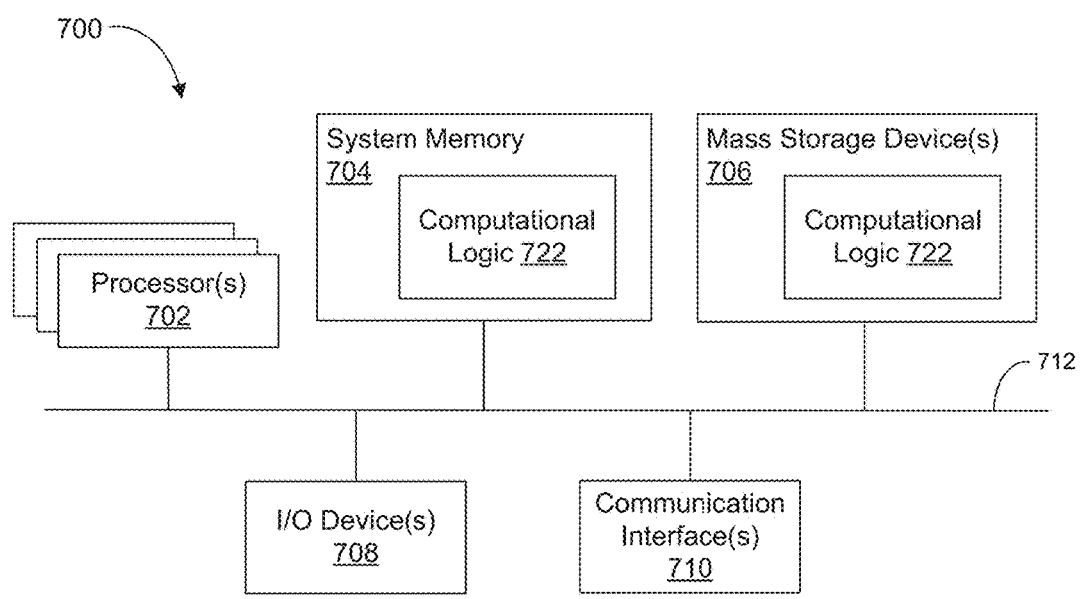
FIG. 7 illustrates a component view of an example computer system suitable for practicing the disclosure, in accordance with various embodiments.

Referring now to FIG. 7, wherein an example computing device suitable to implement any of the servers or mobile devices discussed herein, in accordance with various embodiments, is illustrated. As shown, computing device 700 may include one or more processors or processor cores 702, and system memory 704. In embodiments, multiple processor cores 702 may be disposed on one die. For the purpose of this application, including the claims, the terms "processor" and "processor cores" may be considered synonymous, unless the context clearly requires otherwise. Additionally, computing device 700 may include mass storage device(s) 706 (such as flash drive, diskette, hard drive, compact disc read-only memory (CD-ROM), and so forth), input/output (I/O) device(s) 708 (such as camera, display device, keyboard, cursor control, gyroscope, accelerometer, and so forth), and communication interfaces 710 (such as network interface cards, modems, and so forth). In embodiments, a display device may be touch screen sensitive and may include a display screen, one or more processors, storage medium, and communication elements. Further, it may be removably docked or undocked from a base platform having the keyboard. The elements may be coupled to each other via system bus 712, which may represent one or more buses. In the case of multiple buses, the buses may be bridged by one or more bus bridges (not shown).

Each of these elements may perform its conventional functions known in the art. In particular, system memory 804 and mass storage device(s) 806 may be employed to store a working copy and a permanent copy of programming instructions implementing the operations described earlier (e.g., but not limited to, operations associated with OS 104, native application 106, web browser 110, website 112, discovery engine 108a or 108b, or analysis engine 124) generally referred to as computational logic 722. The various operations may be implemented by assembler instructions supported by processor(s) 702 or high-level languages, such as, for example, C, that may be compiled into such instructions.

The permanent copy of the programming instructions may be placed into permanent mass storage device(s) 706 in the factory, or in the field, through, for example, a distribution medium (not shown), such as a compact disc (CD), or through communication interface 710 (from a distribution server (not shown)). That is, one or more distribution media having an implementation of any of the operations described earlier may be employed to distribute these components to various computing devices.

The number, capability, and/or capacity of these elements 702-712 may vary, depending on the intended use of example computing device 700, e.g., whether example computer 700 is a smartphone, tablet, ultrabook, laptop, desktop, server, etc. The constitutions of these elements 710-712 are otherwise known, and accordingly will not be further described.

FIG. 8 illustrates an example non-transitory computer-readable storage medium having instructions configured to practice all or selected ones of the operations associated with the processes described above. As illustrated, non-transitory computer-readable storage medium 802 may include a number of programming instructions 804. Programming instructions 804 may be configured to enable a device, e.g., computing device 700, in response to execution of the programming instructions, to perform one or more operations of the processes described in reference to FIGS. 1-6. In alternate embodiments, programming instructions 804 may be disposed on multiple non-transitory computer-readable storage media 802 instead. In still other embodiments, programming instructions 904 may be encoded in transitory computer-readable signals.

Referring back to FIG. 7, for one embodiment, at least one of processors 702 may be packaged together with memory having computational logic 722 (in lieu of storing in memory 704 and/or mass storage 706) configured to perform one or more operations of the processes described with reference to FIGS. 1-6. For one embodiment, at least one of processors 702 may be packaged together with memory having computational logic 722 configured to practice aspects of the methods described in reference to FIGS. 1-6 to form a System in Package (SiP). For one embodiment, at least one of processors 702 may be integrated on the same die with memory having computational logic 722 configured to perform one or more operations of the processes described in reference to FIGS. 1-7. For one embodiment, at least one of processors 702 may be packaged together with memory having computational logic 722 configured to perform one or more operations of the process described in reference to FIGS. 1-6 to form a System on Chip (SoC). Such an SoC may be utilized in any suitable computing device.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system. As used herein, module may refer to a software module, a hardware module, or any number or combination thereof.

As used herein, the term module includes logic that may be implemented in a hardware component or device, software or firmware that may be run or running on a processor, or a combination of processors. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

What is claimed is:

1. An apparatus comprising:
a communication interface to transmit and receive data over a network; and
an analysis server, coupled with the communication interface, operable to:
transmit, via the communication interface, a list of a plurality of uniform resource identifier (URI) schemes to a discovery engine of a mobile device;
receive, from the discovery engine, in response to transmission of the list, an indication of a subset of the plurality of URI schemes that are supported by the mobile device;
correlate individual URI schemes of the subset of the plurality of URI schemes with one or more associated native applications to identify native applications installed on the mobile device to automatically profile the mobile device;
receive first user activity information and a unique identifier associated to the mobile device from one or more of the native applications installed on the mobile device, the unique identifier generated independently of personal identifying information (PII) associated to the mobile device or a user of the mobile device;
receive second user activity information and the unique identifier from the mobile device;
correlate the first user activity information with the second user activity information utilizing the unique identifier to automatically profile the user of the mobile device;
associate the user of the mobile device with at least one user segment associated with a plurality of additional users; and,
utilize the at least one user segment to send targeted communications to either the user of the mobile device or the user segment as a whole;
wherein the unique identifier is generated on the mobile device based on an address record set;
wherein the address record set is obtained by the mobile device through performance of address record requests, for a plurality of domain names, from a DNS server that randomly selects an address record for each domain name from a plurality of address records associated with the respective domain name to add to the address record set.

2. The apparatus of claim 1, wherein the analysis server is further operable to:
receive, via the communication interface, a request for the list of the plurality of URI schemes from the discovery engine, wherein to transmit the list of the plurality of URI schemes is in response to the request received from the discovery engine.

3. The apparatus of claim 1, wherein receiving an indication of a subset of the plurality of URI schemes that are supported by the mobile device further includes receipt of the unique identifier.

4. The apparatus of claim 1, wherein the analysis server is further operable to:
determine demographic statistics to associate with the user of the mobile device based on one or more of:
the list of native applications installed on the mobile device;
the first user activity information; or
the second user activity information.

5. The apparatus of claim 4, wherein the analysis server is further operable to:
determine one or more marketing personas to associate with the user of the mobile device based, at least in part, on the list of native applications installed on the mobile device.

6. The apparatus of claim 5, wherein to determine one or more marketing personas to associate with the user of the mobile device is further based on one or more of:
the first user activity information;
the second user activity information; or
the demographic statistics.

7. One or more non-transitory computer-readable memory having instructions stored thereon, wherein the instructions, in response to execution by a mobile device, provide the mobile device with a discovery engine to:
request, from a domain name service (DNS) server, on behalf of the mobile device, an address record for each domain name of a plurality of domain names to create an address record set;
generate, based on the address record set, a unique identifier to associate with the mobile device for subsequent use to automatically profile the mobile device, the unique identifier generated independently of personal identifying information (PII) associated to the mobile device or a user of the mobile device;
determine a set of uniform resource identifier (URI) schemes supported by native applications installed on the mobile device;
report the set of URI schemes to a remote server to enable the remote server to determine a set of native applications installed on the mobile device based on the set of URI schemes;
retrieval of IP addresses of the address record set from a DNS cache of the mobile device; and,
generation of the unique identifier from the IP addresses;
wherein an individual address record of the address record set is randomly selected by the DNS server from a plurality of address records associated with the respective domain name.

8. The one or more non-transitory computer-readable memory of claim 7, wherein the discovery engine is part of a website to be requested by the mobile device wherein to generate the unique identifier further comprises:
submission of hypertext terminal protocol (HTTP) requests to internet protocol (IP) addresses of the address record set; and
generation of the unique identifier from responses returned to the mobile device in response to the HTTP requests.

9. The one or more non-transitory computer-readable memory of claim 8, wherein the responses replicate the IP addresses of the address record set.

10. The one or more non-transitory computer-readable memory of claim 8, wherein the discovery engine is further operable to monitor activities of the mobile device at the website, and report the activities of the mobile device to a remote server along with the unique identifier to enable the activities of the mobile device to be aggregated with previous activities associated with the unique identifier.

11. The one or more non-transitory computer-readable memory of claim 7, wherein to determine a set of URI schemes supported by native applications installed on the mobile device includes:
receipt of a list of identifiers of URI schemes;
iteration through the list of URI schemes to determine a subset of URI schemes from the list of URI schemes that are supported by at least one native application installed on the mobile device.

* * * * *